United States Patent
Novosel et al.

[11] 3,767,544
[45] Oct. 23, 1973

[54] SURFACE TREATMENT OF HIGH SPEED STEEL METAL CUTTING TOOLS AND THE PRODUCT THEREOF

[75] Inventors: Thomas A. Novosel, East Burke; Donald O. Erskine, Lyndon Center, both of Vt.

[73] Assignee: Vermont American Corporation, Louisville, Ky.

[22] Filed: Sept. 2, 1971

[21] Appl. No.: 177,338

[52] U.S. Cl. ............................ 204/141.5, 204/145 R
[51] Int. Cl. ............................ C23b 3/02, C23b 1/04
[58] Field of Search ............. 204/140, 145 R, 141.5, 204/129.75

[56] References Cited
UNITED STATES PATENTS

| 2,078,869 | 4/1937 | Oplinger | 204/145 R |
|---|---|---|---|
| 2,915,444 | 12/1959 | Meyer | 204/145 R |
| 3,207,683 | 9/1965 | Hermann | 204/140.5 |

FOREIGN PATENTS OR APPLICATIONS 200,740   1/1939   Switzerland

Primary Examiner—T. Tufariello
Attorney—John A. Dienner et al.

[57] ABSTRACT

The subject invention provides a method of treating the working surfaces of high speed steel metal cutting tools to reduce the friction between the surface of the cutting tool and the workpiece and/or the chip and the novel tool produced thereby. The method involves a transformation of the working surface on the steel tool which transformation involves the removal of the multitude of tiny carbide particles that appear in random positions on the working surface. This modified surface layer from which the carbide particles are removed leaves a honeycomb like hole structure where they were, extends to a depth equal to about the average size of carbide particles, at most in the low hundred thousandths of an inch. The removal of this surface layer of carbide particles appears to reduce friction between the active tool surfaces and the workpiece and/or chip is substantially reduced, with consequent reduction in buildup of material on the edge of the tool and reduction of friction of the tool with the chip and/or the workpiece.

The process of the invention is advantageous in the surface treatment of high speed steel cutting tools such as twist drills and the like. It is particularly advantageous for the treatment of drills employed to drill holes into soft, gummy metals like aluminum, copper, titanium, and some stainless steels and the like, but is not limited thereto.

The high speed steels employed for making the metal-cutting tools herein disclosed comprise a major proportion of iron, containing carbon, and alloying metals known as "carbide formers" including molybdenum, tungsten, chromium and vanadium. Cobalt may also be present. These alloying elements are suitably proportioned to provide the particular properties desired for a specific tool as is well understood in the art.

5 Claims, 7 Drawing Figures

PATENTED OCT 23 1973
3,767,544
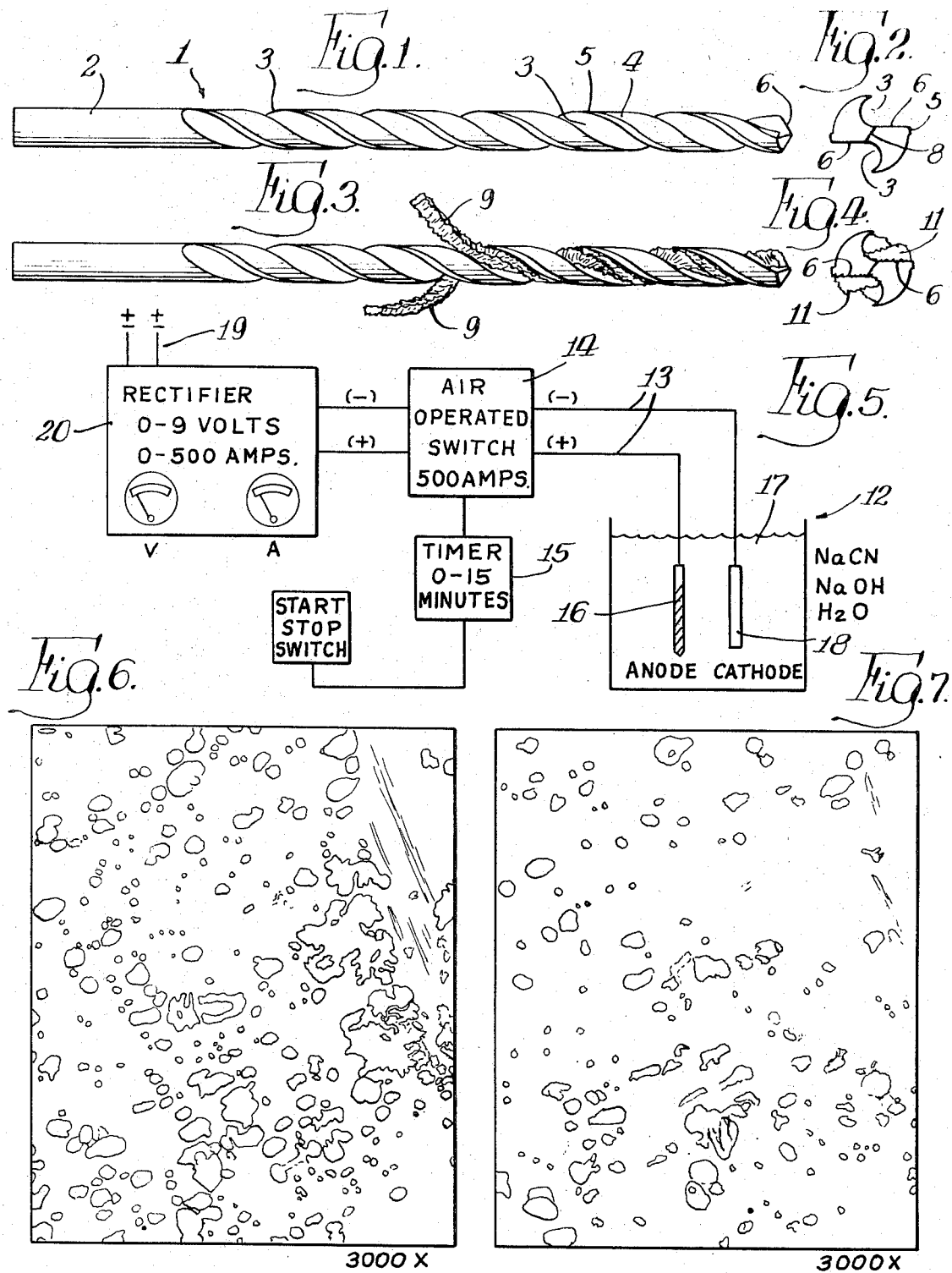

SURFACE TREATMENT OF HIGH SPEED STEEL METAL CUTTING TOOLS AND THE PRODUCT THEREOF

BACKGROUND OF THE INVENTION

The art is aware of the difficulties brought about by the buildup of material from the workpiece upon the edge of a metal cutting tool. The friction resulting from the high unit pressure between the cutting edge and the workpiece, and the abrading effect of the chips on the working face of the tool produce high temperatures on/or adjacent the cutting edge which accelerates wear and causes failure in the performance of the tool.

This difficulty is encountered in high degree in respect of tools such as twist drills employed to drill deep holes in soft, gummy metals. The chip which is coherent and wire-like must be pushed out through the restricted passageways permitted by the flutes of the drill, or exit passageways of the particular tool involved.

The art has previously developed certain surface treatments for reducing friction and prolonging the working life of a tool employed for this type of work. The surface treatment of the present invention has shown, in comparative tests, a marked superiority over known methods of surface treatment of high speed steel metal cutting tools, particularly such as twist drills.

In the manufacture of twist drills, grinding or mill-ing the flutes to the final dimensions is the general practice. The surface left by grinding or milling, as seen under suitable magnification, is rough due to ridges and grooves left by the abrasive or cutter, and this augments friction to the flow of the chip into and through the flutes to the outside of the hole.

One proposal of the prior art is to electropolish the surface of the drill. It leaves the surface clean and bright. It appears to reduce the ridges and grooves produced by the grinding or milling operation and provides an attractive, clean metal surface. By itself it has no substantial effect upon the coefficient of friction with the chip or workpiece.

Chromium plating of the surface of the drill has been introduced. This puts a covering layer of hard, smooth chromium on the surface. However, being a layer, it tends to separate under heavy stresses.

Steam oxidation of the surface of the drill is known. This produces a layer of oxide which is of a character different from that of the body of the metal and it also tends to flake and separate under stress.

High speed steels employed for metal cutting tools of the type herein referred to follow two general types, (1) the predominantly molybdenum high speed steels and (2) the predominantly tungsten high speed steels. However, additional alloy metals such as chromium, vanadium and cobalt are also used to impart desired properties. These alloying metals as a class are sometimes termed "carbide formers" since the presence of any of them promotes the formation of carbides. We have discovered that in respect of high speed steel metal cutting tools employing alloy compositions which result in the formation of carbides, that these tiny carbide particles exposed on and substantially flush with the working surfaces of such steel tools appear to be responsible in large part for the friction resulting from the pressure and flow of the chip upon the cutting tool. In the operation of cutting tools such as twist drills, the relatively high angle which the chip makes with the advancing edge of the point and the high pressure and speed of operation in buildup of material of the workpiece on the front edge of the cutting tool with increased friction between the chip and the cutting tool results in high temperature and increasing rate of buildup on the cutting edge. The action is cumulative.

SUMMARY OF THE INVENTION

We have discovered that friction inherent in the operation of a high speed steel metal cutting tool, which includes carbide formers in its composition, upon a metal workpiece can be reduced by a surface treatment of the cutting tool which removes the tiny carbide particles from the surface layer of the working surface of the tool such as a twist drill following the grinding operation which brings the cutting tool to its working form.

Although the invention is applicable to other specific cutting tools made of high speed steel for use in a wide variety of metal cutting operations, the application of the process of the present invention to a specific tool is described in connection with the preparation and operation of high speed steel twist drills.

It is in connection with the use of twist drills required to drill deep holes of small as well as large diameter in soft, gummy metals that application of the present surface treatment to a high speed steel tool shows exceptional superiority to other methods of production of a tool for the same purpose. The process of the invention involves subjecting the tool, such as a steel twist drill, after grinding to finished size and cleaning the surface, to electrolysis in an electrolytic cell with an aqueous solution of sodium hydroxide and sodium cyanide in substantially equal proportions wherein the tool serves as an anode in the bath. The electrolytic treatment levels off the ridges and grooves left by the finish grinding and removes from the face of the metal the multitude of tiny carbide particles that are present in great numbers per unit area. In this microscopically thin modified surface layer, tiny holes remain exactly where these carbide particles were formerly located. Under the influence of the electrolytic action it appears that the sodium hydroxide attacks and dissolves the exposed surface carbides, while the sodium cyanide etches the metal matrix in which these carbides are embedded. Time in this electrolytic bath is a factor. The longer the time the greater the depth of the action on the tool. More metal matrix would be etched away exposing more tiny carbide particles that would be dissolved. Ultimately the tool would be destroyed for useful purposes. Under ideal conditions timing would be adjusted so that actually only those tiny carbide particles exposed on the surface of the finish ground tool were dissolved, thus forming the desired modified surface layer. The treatment generally reveals lines that appear to be grain-like boundaries in the metal matrix. There is question as to whether these lines actually are grain boundaries as known in the art of metallurgy. All of these conditions related are as observed under scanning electron beam microscopy.

Comparative tests of drills prepared according to the surface treatments of the prior art with drills treated in accordance with the present invention have shown that the drills treated in accordance with the present invention have a much longer working life than drills treated according to processes of the prior art. This extended life more than pays for the cost of the treatment as per the present invention.

The process of the present invention produces a novel surface on the cutting tool and produces a lubricative, anti-weld and anti-friction property of the treated surface of the tool. This reduces the buildup and galling of the cutting edge and chip-engaging face of the tool resulting in lower cutting temperatures and longer cutting life. The process of the invention does not deposit any additive material on the cutting tool surface but permanently transforms the surface of the tool avoiding the possibility of peeling or flaking or deterioration due to coolants, oils and chemicals.

Superiority of drills of the present invention over the prior art shows up also in drilling harder materials such as stainless steels and even the abrasive and hard cast iron.

The requirements of the drill as a metal cutting tool find parallel requirements in other metal cutting tools such as thread-cutting taps, reamers, end milling cutters, combined drill and countersink and the like. This is true particularly in those cases where the buildup of material on the cutting edge interfaces with clean, sharp cutting and free-flowing chip removal under heavy-duty cutting of the workpiece by the tool.

OBJECTS OF THE INVENTION

The chief object of the present invention is to provide a surface treatment for high speed steel metal cutting tools which will extend the useful life of the tool so treated and the improved tool produced by said treatment.

A further object of the invention is to reduce the buildup of material upon the cutting edge of the tool so treated.

A further object is to reduce the abrading effect of the chip upon the face and chip passageways of the tool.

A further object is to prevent the buildup of high temperatures upon the face and cutting edge of the tool by treatment in accordance with the present invention.

A further object is to provide an electrolytic treatment of high speed steel cutting tools which will remove carbide particles from the working surface of the tool.

A further object is to provide an electrolytic surface treatment for twist drills and the like to prolong the useful life of the same.

DESCRIPTION OF THE DRAWINGS

FIG. 1 is a side elevational view of a high speed steel twist drill of known form but which has received the surface treatment of the present invention; it is slightly gray in appearance;

FIG. 2 is an end view of the drill of FIG. 1 on an enlarged scale taken from the right of FIG. 1; FIGS. 1 and 2 show the appearance of the drill after drilling a predetermined number of holes through an aluminum test block;

FIG. 3 is a side elevation of a drill of the same size and form as that of FIG. 1 but without having received the surface treatment of the present invention; this shows the condition of the untreated drill after completing only a part of the predetermined number of holes through the aforesaid aluminum test block having the chips welded at their inner ends to the cutting edges on the point of the drill, said chips lying partly within the flutes of the drill and extending outside the flutes beyond the hole drilled;

FIG. 4 is an end elevation on an enlarged scale of the drill and chips of FIG. 3 taken from the right of FIG. 3;

FIG. 5 is a circuit diagram of an electrolytic cell and power supply for applying the surface treatment of the invention to produce drills of the invention;

FIG. 6 is a plan view at 3,000× of a small area of the flute surface of a twist drill of the same form and composition as the drill of FIG. 1 prior to the application of the electrolytic treatment of the invention. The purpose is to show the typical distribution of the tiny carbide particles on the working surface of the twist drill. In order to do this the matrix was slightly etched away to expose these carbide particles. The sketch was made from a scanning electron beam microscopic photograph.

FIG. 7 is a plan view at 3,000× of the same area as that shown in FIG. 6 after the same surface, shown in FIG. 6, has been treated by the process of the invention. This sketch was also made from a photograph under the same circumstances as explained for FIG. 6. Note that we now have tiny holes instead of carbide particles, that the layout pattern is the same as in FIG. 6 and the size and shape of the holes exactly resemble those of the carbide particles shown in FIG. 6. If the time of treatment described in the invention had been extended on the sample shown in FIG. 6 this pattern, as shown in FIG. 7, would have been obliterated since more of the matrix would have been etched away, more carbide particles exposed and dissolved by the treatment.

DESCRIPTION OF THE PREFERRED EMBODIMENT

The development of metal cutting tools has been under intensive study during the last 50 years. This is due to the economic pressure for greater machine output.

Primary development along this line has been made in the composition of high speed cutting steels for cutting various metals or compositions of metals. These steels generally include in their analyses iron and carbon and certain metallic alloying constituents which add greatly to the life of the resultant tool.

These improved alloy cutting steels employ various proportions of molybdenum, chromium, vanadium, tungsten and cobalt, usually with either molybdenum or tungsten as the predominent alloy constituent. These alloy constituents are frequently referred to as "carbide formers."

Those skilled in the art of cutting tools designate under the term "high speed steel" steel analyses containing various alloying metals in various proportions to provide particular qualities and capabilities.

A metal cutting operation involves the movement of a tool, having a cutting edge, relative to a workpiece to sever a chip from the workpiece, which chip has movement along the rake face of the tool, there being a clearance between the bottom of the tool and the face of the workpiece by what is known as the relief angle. This mechanism is common to all metal cutting tools whose function is chip removal from the workpiece.

The specific embodiment herein illustrated and described in detail is a high speed metal cutting twist drill of the form illustrated in FIG. 1 having a cutting and chip-engaging surface of the character illustrated in FIG. 7. This drill, as an example, is made of high speed steel of the molybdenum type, designated in the art by the symbol M-7, and comprising carbon and the alloying elements of molybdenum 8¾ percent, chromium 4 percent, vanadium 2 percent and tungsten 1¾ percent. The invention is not confined to a specific formula for the composition of the steel. Another typical composition frequently employed in the manufacture of drills is a steel having a composition designated in the art by the symbol M-2. The invention is not to be confined to twist drills but is applicable to high speed steel cutting tools generally which encounter the same problems, but perhaps in somewhat less degree than the twist drill.

As shown in FIG. 1 the twist drill 1 has a straight shank 2 at the mounting end, and helical flutes 3, in this case two in number. These flutes have been ground into the body of the cylindrical blank from which the drill is made, after hardening. Between the flutes are the helical lands 4 upon the leading edges of which there are so-called margins 5 which at the cutting edges 6—6 extend to the full diameter of the drill and determine its effective diameter of cut. At the point end of the web, which is the thinnest part of the drill, there is the so-called chisel edge 8. In the operation of the drill the chisel edge 8 is forced into the metal to bring the cutting edges of lips 6—6 into play and the said cutting edges or lips sever the chips, one in each flute. Said flutes in normal operation of the drill conduct the chips either as continuous wirelike pieces, as shown in FIG. 3 at 9, or as fragments which travel up through the flutes to the outside of the hole which the drill has formed.

At the bottom of the hole which the drill is forming, the cutting edges or lips 6 sever material from the workpiece, and the chip from each cutting edge is forced to move upwardly through the flutes 3—3 to the outside of the hole. The material from the workpiece which goes to form the chip must make a sharp rising movement against the face of the flute immediately adjacent to the lip, and it is at this point that the major part of the work of the drill is done. Metal from the workpiece is severed and raised to form the chip and where the friction of the chip on the edge and on the face of the flute is excessive the temperature will rise, sometimes to approximately the melting point of the material of the workpiece, particularly in the case of soft, gummy metals such as aluminum and copper. The material from the workpiece tends to form a buildup or deposit 11 on the cutting edge of the lip 6 and becomes welded to it. As this deposit 11 builds up, the efficiency of the drill is lowered and the friction of the drill in the hole becomes so great as to result either in the drill no longer cutting and becoming ineffective or in actual breakage of the drill.

The prior art is aware that the resistance to chip formation and chip removal from a cutting tool such as a drill may be facilitated by surface treatment of the cutting tool. Such known treatments include surface oxidation of the drill in a steam atmosphere to give a black oxide coating to the treated surfaces. Another expedient is chromium plating of the working surfaces of the drill. Both of these methods improve the life of the drill in some degree.

Practically the only surface treatment of the prior art which improves drill performance sufficiently to pay its cost is the steam oxide treatment which gives the drill a coating of black oxide.

We have discovered that the serviceability and life of high speed twist drills and similar cutting tools may be greatly improved by an electrolytic surface treatment of the high speed steel which removes the surface layer of tiny carbide particles as they originally appear on the working surface so treated.

Drills made of high speed steel are, according to the present invention, subjected to the electrolytic treatment diagrammatically illustrated in FIG. 5. The electrolytic cell 12 is supplied with direct current over the conductors 13 through the air operated switch 14 capable of interrupting heavy currents of the order of 500 amperes for a commercial installation. The switch 14 is controlled by a timer 15 which is set to predetermined time for the electrolytic treatment of the drill 16 as an anode in the electrolytic bath 17 consisting of sodium cyanide and sodium hydroxide in substantially equal proportions by weight dissolved in water to make up an electrolyte at a Baume gravity of from 16°–17° in a newly prepared solution. The cathode 18 is a bar of mild steel.

Power may be supplied over leads 19 connected to a commercial source of alternating current which supplies the rectifier 20 with power to deliver direct current at a voltage of 9 volts and up to 500 amperes for treatment of a multiplicity of drills at the same time. Instead of the single drill shown as subjected to the treatment, we may treat a batch of drills by using a tumbling barrel with insulated conductors terminating in steel anodes exposed on the inside of the barrel to contact the drills in the electrolytic bath. The anodes keep contact with the drills as they are tumbled to maintain the electrolytic treatment while the drills change position for more nearly uniform effect of the electrolytic action upon them. Ordinarily the tumbling barrel is satisfactory to treat drills in diameters from one-eighth through one-half inch in lots of the same size providing the number of pieces in the lot is of sufficient quantity.

For treatment of drills smaller than one-eighth inch in diameter a channel type magnetic rack is used to hold the drills in position, the direct current passing through the magnetic holding device.

Drills larger than one-half inch are held during treatment in a mechanical type rack and the electrical connection made by means of large alligator clips. At times it is necessary to treat smaller quantities of drills in sizes from one-eighth inch through one-half inch than would be suitable for handling in the tumbling barrel and these smaller quantities are treated in the same type racks and in the same manner as described for the larger drills.

The electrolytic treatment of the invention leaves the surface of the drill with a light gray color which makes the drill so treated readily distinguishable from the drill with "bright finish" produced by the conventional grinding operations ordinarily used to grind drills to final dimensions.

We have run comparative tests, on the same workpiece and under the same operating conditions, of twist drills made of high speed steel and surface treated according to the present invention and twist drills of the same high speed steel, surface treated in accordance with the practice of the prior art, to compare efficacy of the prior art surface treatments with that of the present invention. Such tests have shown that the surface treatment of the present invention produced cutting tools—more specifically, twist drills—substantially superior in performance to similar twist drills treated in accordance with the teaching of the prior art. This superiority is great enough to make the treatment economically feasible.

We submit below a test report comparing drills prepared in accordance with the present invention with those prepared in accordance with the prior art in connection with the drilling of holes in mild steel. The material through which the drills operated was a plate of mild steel one inch thick which called for the drilling of a "deep hole," since a "deep hole" is generally regarded as one which is four or more drill diameters deep.

Drills Tested 3 drills No. 7 (0.2010 inch dia,) General purpose Jobbers Drills "Vermont" Style D-300 bright finish, no surface treatment.

3 drills same as above except steam oxidized.

3 drills same as first group except surface treated according to the present process.

Test Material 1 inch thick mild steel: 149-156 Brinnel Hardness Number

Speed

2850 R.P.M.; surface feet per minute

Feed 0.0047 inch/rev., 13.4 inch penetration per minute

Coolant

Soluble Oil Emulsion

Purpose of test

To compare the preformance of drills of the present invention with the performance of surface treated drills of the prior art, the test being run on a material (mild steel) widely encountered in drill operations.

Results of Test

| Drill Nos. | No. of holes | Total | Performance % |
|---|---|---|---|
| 1 — Bright Finish | 1870 | | |
| 2 — Bright Finish | 1634 | | |
| 3 — Bright Finish | 1946 | 5450 | 100% |
| 4 — Steam Oxide | 2231 | | |
| 5 — Steam Oxide | 2410 | | |
| 6 — Steam Oxide | 2376 | 7017 | 130% |
| 7 — "Test" * | 2764 | | |
| 8 — "Test" * | 2980 | | |
| 9 — "Test" * | 2891 | 8635 | 158% |

* Drills of the present invention

While the above test shows that drills, surface treated by steam oxide treatment, will out-perform bright finished drills having no surface treatment, by 30 percent, drills treated in accordance with the present invention give almost twice the increase in performance of drills having steam oxide surface treatment on mild steel.

In connection with the drilling of soft, gummy metals such as aluminum, copper, titanium and some of the stainless steels as well as other metals and their alloys, the superiority of drills of the present invention over drills treated in accordance with the prior art is much greater. In the drilling of aluminum and the like the material from the workpiece welds onto the cutting edge of the drill and builds up in the flutes destroying the efficiency of the drill as a cutting tool. The chip, instead of showing a clean cut surface, resembles more nearly a drawn wire which continues on from the cutting edge through the corresponding flute and out of the hole.

The variable of current density, temperature, concentration of solution, and time are not found to be too critical but nevertheless should be controlled between certain limits.

Current Density

The current density generally runs approximately 0.5 to 2.0 amperes per square inch of the parts being treated. A lesser current density and a longer time would accomplish similar results. In practice the total direct current amperes into the bath generally remain constant and the time in the bath is used for control.

Temperature

The bath is maintained between 125° and 145°F. By an electrical heater in the bath and thermostatic control, normally the bath is kept between 135° and 140°F.

Concentration of Solution

The new solution is made up with 12-15 ounces of sodium hydroxide and 16-20 ounces of sodium cyanide per gallon of water. Baume runs 16°-17° for the new solution but as weeks of use pass by gradually rises to around 31° and then tends to level off. The concentration of both chemicals in the bath is periodically maintained by the addition of chemicals as required based upon conventional chemical analysis.

Time

The time varies between 3 to 10 minutes depending on the total weight and the surface area versus unit weight relationship of the particular type tools being treated. For example, with a total of 200 direct current amperes going through the bath and load, a light load of ⅛ inch drills in the tumbling barrel might require 3 minutes and a large load of the same drills 10 minutes to complete the treatment.

Surface color provides a fair indication for the extent of the treatment. A light gray color is desired. Darker gray indicates overtreatment which generally means that etching has progressed beyond just the surface layer and that carbide particles further down into the tool have also been removed, all of which is undesirable.

Test runs comparing the drill of the present invention with the drills prepared by surface treatment in accordance with the prior art show improvement in the drills of this invention in number of holes drilled, generally in the range of from 2 to 4 times as many holes drilled by drills of the present invention as by drills prepared in accordance with the prior art. The improvement shown in the specific test above reported is in about the lowermost range of improvements shown by tests on various metals which we have conducted.

We claim:

1. Electrolytic surface treatment of a cutting tool of high speed steel which contains iron and carbon and one or more carbide-forming alloying metals and hard carbide particles in the body and on the surface of the steel, which comprises subjecting the tool as an anode to electrolysis of a unidirectional current in an aqueous bath of substantially equal parts of sodium cyanide and sodium hydroxide at an initial Baume of 16°-17° and at a temperature of from 135°-145°F for a period of from approximately 3 to 10 minutes at a current density of from approximately 0.5 to 2 amperes per square inch to remove said carbide particles from the surface which is treated.

2. A method of surface treating a steel cutting tool having chip engaging surfaces to reduce the friction of said chip-engaging surfaces with the chip, which method comprises subjecting said surfaces to electrolytic treatment with the tool as an anode in the electrolytic bath of substantially equal parts of sodium hydroxide and sodium cyanide in water at a Baume of approximately 16° at the start and at a temperature of approximately 135° to 140°F at a current density of approximately 0.5 to 2 amperes per square inch for a period of from 3 to 10 minutes to remove carbide particles from chip engaging surfaces of the tool.

3. The method of claim 2 wherein the tool is a twist drill having lands, flutes and a point, said point having cutting edges.

4. The method of smoothing tool marks and removing exposed carbide particles from the working surface of a high speed steel cutting tool containing hard carbide particles exposed at the working surface which comprises subjecting the said working surfaces to electrolysis with the cutting tool serving as an anode in an electrolyte of substantially equal parts of sodium hydroxide and sodium cyanide.

5. Method of producing a high speed steel twist drill of superior performance in drilling relatively soft, tenacious metals which comprises forming a drill of high speed steel which contains iron and carbon and one or more carbide forming alloying metals and contains resulting carbide particles distributed throughout the same, said drill comprising a shank, a body having flutes, lands, margins, a web, lips and cutting edges, and electrolytically removing exposed carbide particles from the surface of the flutes and cutting edges whereby the resulting twist drill will give superior performance on drilling soft, tough metals by virtue of the reduced friction between the surfaces of the drill and the workpiece and the chips produced therefrom.

* * * * *